United States Patent
Slater et al.

(10) Patent No.: US 12,018,798 B2
(45) Date of Patent: Jun. 25, 2024

(54) METHOD FOR HYDRATE CONTROL

(71) Applicant: AKER SOLUTIONS LIMITED, London (GB)

(72) Inventors: Robin Slater, Aberdeenshire (GB); Derek Massie, Oslo (NO); Morten Rengman Morck, Oslo (NO); Einar Winther-Larssen, Oslo (NO); Robert Kamperin, Oslo (NO)

(73) Assignee: Aker Solutions Limited, London (GB)

( * ) Notice: Subject to any disclaimer, the term of this patent is extended or adjusted under 35 U.S.C. 154(b) by 1163 days.

(21) Appl. No.: 16/308,218

(22) PCT Filed: Jun. 9, 2017

(86) PCT No.: PCT/GB2017/051686
§ 371 (c)(1),
(2) Date: Dec. 7, 2018

(87) PCT Pub. No.: WO2017/212288
PCT Pub. Date: Dec. 14, 2017

(65) Prior Publication Data
US 2019/0271440 A1  Sep. 5, 2019

(30) Foreign Application Priority Data

Jun. 9, 2016 (GB) ...................................... 1610083
Aug. 31, 2016 (GB) ...................................... 1614733

(51) Int. Cl.
| | |
|---|---|
| *F17D 1/18* | (2006.01) |
| *F16L 53/35* | (2018.01) |
| *F17D 3/00* | (2006.01) |

(52) U.S. Cl.
CPC ................ *F17D 1/18* (2013.01); *F16L 53/35* (2018.01); *F17D 3/00* (2013.01)

(58) Field of Classification Search
CPC ............... F16L 53/35; F17D 1/18; F17D 3/00
(Continued)

(56) References Cited

U.S. PATENT DOCUMENTS 6,278,095 B1   4/2001  Bass et al.
6,595,487 B2 *  7/2003  Johansen ................ F16K 31/04
                                                  251/129.04
(Continued)

FOREIGN PATENT DOCUMENTS

CN   101059192 A   10/2007
EP     2975317 A1    1/2016
(Continued)

OTHER PUBLICATIONS

Great Britain Examination Report under Section 18(3) for Application No. GB1821309.0, dated Nov. 11, 2021, 3 pages.
(Continued)

*Primary Examiner* — Dana Ross
*Assistant Examiner* — James F Sims, III

(57) ABSTRACT

A method of controlling an accumulation in a fluid system and associated apparatus is disclosed. The method comprises heating. The heating is adaptive or adaptable. The method comprises adapting the heating in accordance with a parameter associated with a development of accumulation. The parameter is monitored. An associated subsea heating system (20) for controlling an accumulation in a subsea flow line (28) is also disclosed.

11 Claims, 4 Drawing Sheets

(58) Field of Classification Search
USPC ........................................................ 219/493
See application file for complete search history.

(56) References Cited

U.S. PATENT DOCUMENTS

| | | | |
|---|---|---|---|
| 6,644,848 B1 | 11/2003 | Clayton et al. | |
| 6,939,082 B1 | 9/2005 | Baugh | |
| 9,651,183 B2* | 5/2017 | Kristiansen | F17D 1/18 |
| 9,742,163 B2* | 8/2017 | Aarskog | H01H 50/045 |
| 2002/0011335 A1* | 1/2002 | Zhang | H01M 8/04089 |
| | | | 166/57 |
| 2008/0236810 A1 | 10/2008 | Bornes et al. | |
| 2010/0044053 A1 | 2/2010 | Grimseth et al. | |
| 2010/0101663 A1 | 4/2010 | Granborg | |
| 2013/0186637 A1* | 7/2013 | Wright | E21B 41/04 |
| | | | 166/363 |
| 2013/0292130 A1* | 11/2013 | Bennett | H01M 6/425 |
| | | | 166/351 |
| 2015/0036256 A1* | 2/2015 | Baker | H02J 4/00 |
| | | | 361/191 |

FOREIGN PATENT DOCUMENTS

| | | |
|---|---|---|
| GB | 2304392 A | 3/1997 |
| WO | 200191206 A2 | 11/2001 |
| WO | 2007055592 A1 | 5/2007 |
| WO | 2013089691 A1 | 6/2013 |
| WO | 2013/124270 A1 | 8/2013 |
| WO | 2013/188012 A1 | 12/2013 |
| WO | 2015199546 A1 | 12/2015 |
| WO | 2016059446 A1 | 4/2016 |

OTHER PUBLICATIONS

International Search Report dated Sep. 13, 2017 for International Application PCT/GB2017/051686 filed Jun. 9, 2017; 3 pages.
Written Opinion dated Sep. 13, 2017 for International Application PCT/GB2017/051686 filed Jun. 9, 2017; 11 pages.
Combined Search and Examination Report dated Dec. 12, 2016 for GB patent application No. GB1610083.6; 8 pages.

* cited by examiner

METHOD FOR HYDRATE CONTROL

TECHNICAL FIELD

This disclosure concerns a method for controlling accumulation in a fluid system, particularly, but not exclusively, a subsea flow line, and associated apparatus. This disclosure also concerns subsea power supply.

BACKGROUND

Fluid in fluid systems, such as in subsea pipelines, can be sensitive to accumulations affecting flow. Particularly, but not exclusively, subsea flow lines in deep water may be subjected to flow assurance issues. Often longer flow lines or flow lines in deeper water or colder environments subject a fluid in the flow line to cooling. Although the flow line may insulate the contents of the flow line to an extent, in some instances the contents may be sufficiently cooled so as to affect flow. For example, a fluid may be sufficiently cooled so as to generate an accumulation of wax or hydrate in the flow line that can affect a flow rate of fluid through the flow line.

The accumulation causes a narrowing or a reduction of a cross-sectional flow area that can directly impede flow through the flow line. In addition, the reduction of a cross-sectional flow area can result in a pressure differential across the accumulation, such as a pressure drop. The pressure differential can also affect the properties of the fluid, such as phases, densities, saturation levels and composition ratios that directly and indirectly influence flow. For example a wax accumulation can generate a pressure differential leading to an increased pressure upstream of the accumulation, the increased pressure in turn leading to hydrate formation and exacerbation of the original wax accumulation.

Particularly where the flow is of a hydrocarbon through a production line, a cessation or reduction of flow may be extremely costly and can be hazardous, resulting in kicks, build-ups and other issues with unintended flow patterns. In certain circumstances the accumulation can become so disruptive as to significantly reduce and even halt flow through the flow line. Where a flow line is affected by an accumulation, then remediation or intervention may be required. Remediation typically involves the mechanical or chemical removal of the accumulation. To address the accumulation, flow may be required to be further reduced or otherwise halted, and tools or chemicals conveyed to the accumulation. For example, removal of a hydrate plug may require depressurization of a flow-line along with application of heat or injection of chemicals resulting in long periods without production. In a subsea environment such remediation can be both impractical and hazardous. Often an exact location of the accumulation is unclear and considerable time and money can be invested in establishing the location, nature, cause of and remedy for the accumulation. In some instances, the accumulation may even result in an abandonment of the flow line. Even if the accumulation can be alleviated or remedied, it may not be possible, or at least difficult, to ensure prevention of further such accumulations in the future.

In an effort to prevent or reduce accumulations, flow lines that are anticipated to be subjected to significant cooling (such as longer flow lines in deep water) have been provided with increased thermal insulation to maintain a higher temperature of fluid in the flow line. Other efforts include use of thermo-dynamic inhibitor chemicals (e.g. injecting polymer, alcohol or salt solutions to the fluid) or application of heat through electrical power or hot fluid circulation on the outside of flow-lines. There are several possible technologies for heating systems including hot water circulation, wet direct electric heating (DEH), DEH pipe in pipe and electrical trace heating. The relative merits of these technologies are discussed in a paper, OTC-24711-MS (authors Bruno Ansart, Antoine Marret, Thomas Parenteau, Olivier Rageot; Offshore Technology Conference-Asia, 25-28 Mar. 2014, Kuala Lumpur, Malaysia), the contents of which are incorporated herein by reference.

Particularly with fluid systems in deep water or along particularly lengthy flow lines, access to the flow lines or associated equipment for installation, inspection or maintenance can be more difficult. Generally the provision of functionality, such as power and heating, to such flow lines or further, subsequent flow lines can be awkward and costly.

At least one example of the present invention aims to provide an improved method of accumulation control in a fluid which mitigates one or more of the afore-mentioned problems At least one example of the present invention aims to provide a subsea power supply, which mitigates one or more of the afore-mentioned problems.

SUMMARY

In accordance with a first aspect there is provided a method of powering a system. The system may be associated with a subsea system, such as for a subsea hydrocarbon system. The method may comprise powering a heating system for controlling an accumulation in a fluid system, such as a subsea flow line. The method may comprise powering the heating system using a power source intended for powering another power sink in addition to the heating system.

The method may comprise powering the heating system as an additional or secondary power sink from the power source. The heating system may be powered as a secondary or further functionality from a power source intended and/or used for another or primary power functionality. The heating system may comprise a secondary power sink of the power source. The heating system may comprise an ancillary or auxiliary power sink for the power source. The heating system may constitute a secondary power sink for a power source wherein the power source's another power sink is a primary power sink. The method may comprise retrofitting the heating system to an existing power source, such as an existing power source already associated with the another power sink. The method may comprise retrofitting the heating system to an existing fluid system, such as to an existing flow line. The method may comprise powering the heating system as an ancillary or additional use of the power source at predetermined conditions. The predetermined conditions may comprise selected conditions. The predetermined conditions may comprise predetermined times. The predetermined conditions may correspond to conditions when a parameter is or will be at or beyond a threshold associated with an accumulation in the flow line.

The heating system may be powered by spare or surplus power from the power source. The heating system may be powered from the power source during one or more period/s when the power source is not used or is less used or under-used by the another power sink.

The power source may comprise a single power source to power the heating and the another power sink. The powering of the heating and the another power sink from the power source may be linked or coordinated. The power source may power the heating and the another power sink non-simultaneously. The method may comprise switching or diverting power from the power source between the heating and the another power sink. The method may comprise alternately powering the heating and the another power sink. The method may comprise sequentially or serially powering the another power sink and the heating. The powering of the heating and the another power source may be at least partially temporally discrete. Additionally or alternatively the power source may power the heating and the another power sink simultaneously or concurrently. For example, the power source may power both the heating and the power sink during a powering period and then power only one of the heating and the another power sink during another powering period. The powering of the heating and the another power source may be at least partially simultaneous. The method may comprise varying the power supply from the power source between the heating and the another power sink.

The method may comprise powering or maximally powering the another power sink intermittently and/or periodically. The method may comprise powering or maximally powering the another power sink for a relatively short period/s relative to the powering of the heating.

The powering of the heating and the another power sink from the power source may be independent. For example, the heating may be powered by the power source irrespective of the powering of the another power sink by the power source.

The power source may power at least one of the heating and the another power sink directly. The power source may power both of the heating and the another power sink directly.

The power source may power at least one of the heating and the another power sink indirectly, such as via an intermediary buffer or store. For example the power source may power the heating (and/or the another power sink) via a battery, capacitor, accumulator or the like. At least one of the heating and the another power sink may draw a small charge, such as a low current. The charge may be small relative to a charge of the other of the heating and the another power sink. The charge may be small relative to a maximum possible charge. The relatively small charge may be drawn via the intermediary buffer or store.

The power source may comprise a subsea power source. The power source may comprise one or more of: a subsea battery; a subsea hub; a subsea power line; a subsea power line terminal; a subsea branch power line; a generator; an electrical power source; an actuator power source; a host device; and an umbilical.

The another power sink may comprise a non-inhibition power sink. For example, the other power sink may not be intended to prevent or countenance accumulation development. Alternatively the another power sink may comprise an inhibition power sink, such as a further inhibition. The further inhibition may comprise a dissimilar category of inhibition. Alternatively, the further inhibition may comprise a similar category of inhibition (e.g. two thermodynamic inhibitions). The similar category of inhibition may comprise a dissimilar type of inhibition (e.g. heating and chemical injection). Alternatively, the similar category of inhibition may comprise a similar type of inhibition (e.g. two heating inhibitions).

The another power sink may comprise one or more of: an actuator; a valve; a choke; a pump; an electrically-powered sink. The another power sink may comprise a plurality of power sinks.

The another power sink may influence a parameter or condition associated with the accumulation. For example, the another power sink may be associated with a flow or operating condition of the flow line. The power source may be proximal to or at least associated with a portion of the fluid system, such as the flow line, susceptible to or associated with a possible accumulation. For example, the power source may be associated with a valve, a branch valve, an expanding branch valve, a double expanding branch valve, choke, actuator, connector, pump or the like associated with a change in flow, such as a pressure differential or the like.

The fluid system typically comprises one or more of a valve, a gate valve, a branch valve, an expanding branch valve, a double expanding branch valve, and a connector, such as a tie-in connector. The method therefore typically includes powering a heating system for controlling an accumulation in a fluid system, such as a valve, normally a double expanding branch valve.

In use the valve, normally an interior of the valve, may fill with fluid (e.g. water and/or gas), especially when the valve is in a closed position. The valve, typically when it is in the closed position, may contain at least some accumulation, such as in one or more chambers or passages. The accumulation may comprise a deposition of precipitate and/or hydrate. The precipitate may comprise wax and/or paraffin or the like.

The accumulation will normally form when the temperature of one or more of the fluid system, valve, body of the valve, surrounding environment, water and/or gas, is equal to or below 27° C.

The heating system for controlling an accumulation in the fluid system, such as a valve, typically includes the step of heating one or more of the valve, valve passage, valve chamber, valve bonnet and body of the valve. The heating system is typically an electric heating system, that is the heat is normally generated using electricity. The heating system may be referred to as a direct electric heating system. The heating system typically heats one or more of the valve, valve bonnet and body of the valve to a temperature of above 27° C., normally approximately 30° C., and importantly typically above the melting point of the accumulation.

It may be an advantage of the present invention that the heating system heating one or more of the valve, valve bonnet and body of the valve, heats one or more of fluid, water and/or gas in the valve so that the accumulation, typically the precipitate and/or hydrate, does not form in the valve.

The method may comprise operatively associating the heating of the system (or the activation of the heating of the system, or a part/s thereof) with a parameter, such as an operating condition, of the system. For example, the heating system may be configured to be activated, or only activated, when the parameter corresponds to a risk or increased risk of hydrate formation (e.g. if hydrate formation risk is increased when the valve is closed, or at least partially closed, then the heating may be activated or triggered by the closure or partial closure of the valve).

The method may comprise coordinating or linking the activation or operation of the heating and the another power sink. The method may comprise controlling or activating one of the heating and the another power sink with the other of the heating and the another power sink. For example, where the another power sink is a choke, actuator or other device that may influence the development of an accumulation, the operation of the heating may be linked to the operation of the another power sink. If the another power sink is adjusted, such as a choke closed or opened affecting pressure and possible accumulation, then the heating may be adapted by the another power sink's adjustment (e.g. directly by a same control signal or means, or indirectly by a control dependent on a status or operation of the another power sink).

The power storage unit may be configured to power a primary power sink. The choke may comprise the primary power sink. In other examples, other apparatus may comprise the primary power sink, such as selected from one or more of: an electric actuator; the heating system; a measurement instrument; a valve; a gate valve; a branch valve; an expanding branch valve; a double expanding branch valve; a flow control device; a subsea tool; a sensor; an additional heating system.

The power storage unit may be configured to power the heating. For example a single power storage unit may be configured to power both the primary power sink and the heating. The power storage unit may be configured to store excess energy. The power storage unit may be configured to accumulate energy in excess of the requirements for the primary power sink. For example, where the power storage unit is for powering a choke actuator, the power storage unit may be configured to accumulate energy in excess of the requirements for choke movement (e.g. the method may comprise expanding the choke power storage several kWh beyond normal requirements, the normal requirements being those purely for the normal operation of the choke). This excess energy may be utilized for other applications, for example for the heating (e.g. for a temporary heating of a short section of pipeline or other fluid system section for hydrate prevention or remediation). Hydrate prevention may be preferred as the energy required to remediate a hydrate plug may be considerably higher than the energy required to prevent a hydrate plug (e.g. when considering latent heat associated with melting). Accumulation prevention may be more beneficial than accumulation remediation as there may be additional safety challenges from gas expansion and the risk of differential pressures across the accumulation—particularly where the accumulation forms a plug.

The power storage unit may be charged through a low power delivery system from topside. For example, the power storage system may be charged with a power delivery system less than about 1 kV AC and less than about 100 W. Accordingly there may be no need to dimension the electrical power distribution system and power cable from topside to match peak power delivery (e.g. thus saving cost by reducing the cross section of conductors and power rating of electrical equipment within the system).

According to a further aspect there is provided a subsea power source for a heating system for controlling an accumulation in a fluid system, such as a subsea flow line. The subsea power source may comprise a power source for another power sink in addition to the heating system.

The power source may be configured to power the heating system as a secondary or further functionality from the power source intended and/or used for another or primary power functionality. The power source may be configured to power the heating system as a secondary power sink of the power source. The power source may be configured to power the heating system as an ancillary or auxiliary power sink for the power source. The power source may be configured to power the heating system as a secondary power sink for the power source wherein the power source's another power sink is a primary power sink.

The power source may be configured to power the heating system with spare or surplus power from the power source. The power source may comprise a power storage unit. The power source may be configured to power the heating system during one or more period/s when the power source is not used or is less used or under-used by the another power sink. The power source may be configured to continuously power the heating system for a particular period. The power source may be configured to discontinuously power the primary power sink. The power source may be configured to continuously power the heating system and discontinuously power the primary power sink during the particular period. The power source may continuously power the heating system for the particular period and intermittently or selectively power the primary power sink only discontinuously during that period—whilst also still continuously powering the heating system.

The power source may comprise a single power source to power the heating system and the primary power sink.

According to a further aspect there is provided a subsea system comprising: a heating system for controlling an accumulation in a fluid system; and a subsea power source, wherein the subsea power source comprises a power source for another power sink in addition to the heating system. The subsea system may comprise the heating system and the another power sink.

According to a further aspect there is provided a method of controlling an accumulation in a fluid. The method may comprise heating. The heating may be adaptive or adaptable. The method may comprise adapting the heating in accordance with a parameter associated with a development of accumulation. The parameter may be monitored.

The accumulation may comprise a deposition of precipitate and/or hydrate. The precipitate may comprise wax and/or paraffin or the like. The method may comprise controlling hydrate and/or wax/paraffin formation in a fluid, such as in a subsea flow line from (or to) a well. The fluid may be in a fluid system. The fluid system may comprise an open fluid system or a closed fluid system. The fluid systems may comprise one or more flow paths, such as along or in one or more flow lines. The flow line may comprise a pipeline. The fluid may comprise a liquid and/or a gas. The fluid may comprise a hydrocarbon. The fluid may comprise water. The fluid may comprise one or more mixtures. The flow line may comprise a production flow line. The fluid may be comprised in one or more of: a flow line; a reservoir; a chamber; a valve; a gate valve; a branch valve; an expanding branch valve; a double expanding branch valve; a pump; a pump bearing; a casing; a cooler; and a scrubber. Controlling the accumulation may comprise preventing and/or remediating the accumulation. Adaptation of the heating in the fluid may comprise adaptation of the heating within the fluid or of the fluid. For example the heating may be within a vessel housing the fluid, such as a conduit defining the flow line, and/or of the vessel, such as of the conduit as such. The development of accumulation may comprise a likelihood or risk of accumulation. The development of accumulation may comprise an initiation and/or a progression of the accumulation.

The heating may comprise heating of one or more of: a flow line; a reservoir; a chamber; a valve; a gate valve; a branch valve; an expanding branch valve; a double expanding branch valve; a pump; a pump bearing; a casing; a cooler; a recirculation line; and a scrubber.

It may be an advantage of the present invention that the heating is adaptive or adaptable, such as to accommodate changes or variations in the fluid or surroundings thereof. For example, the method may allow an increase and/or decrease in heating over a time period (e.g. to accommodate changes in conditions or parameters over time). The fluid may be subject to variations over time, such as periodic, diurnal and/or progressive variation/s. For example, a subsea flowline may be subjected to periodic seasonal variations in temperature. Additionally or alternatively, a composition or property of the fluid/s may vary over a lifespan or use of the fluid system. For example, as a hydrocarbon well is depleted the composition or ratios of hydrocarbons (and often water) and their phases comprised in the fluid may shift over time. Accordingly, the circumstances or likelihood of deposition or hydrate accumulation may vary over time. The provision of a method with adaptive or adaptable heating may ensure an avoidance of an undesirable accumulation in a fluid system over a longer timeframe or lifespan.

The heating may be preventative and/or remedial. The heating may comprise preventative heating in advance of a deposit or hydrate accumulation. The heating may comprise preventative heating in advance of a deposit or hydrate accumulation above a threshold accumulation level. The method may comprise pre-emptively heating in accordance with the monitored parameter; for example, to prevent the parameter reaching a predicted threshold associated with the development of accumulation. The heating may comprise hydrate and/or deposit inhibition. The heating may comprise one or more of: heating of the fluid system; direct heating of the fluid; indirect heating of the fluid; electrical heating; direct electrical heating; wet direct electrical heating; trace electrical heating; pipe-in-pipe heating; fluid circulation; and hot water circulation. The heating may be electrically powered from a power storage unit. The power storage unit may comprise an electric power storage unit, such as a battery or other power storage technology.

The method may comprise responsive heating. The heating may be responsive according to the associated parameter. The parameter may be associated with actual and/or projected deposit/hydrate accumulation. The associated parameter/s may comprise one or more of: a fluid parameter; a measured parameter; a temperature; a pressure; a condition associated with deposition or hydrate formation; a chemical presence or concentration; an operating condition of the flow line; a flow rate; an environmental parameter; an operating condition or status of a further apparatus or system.

The parameter may be directly monitored. For example, the monitored parameter may be a pressure of a fluid in the flow line at a location in the flow line measured at that location. The monitored parameter may be indirectly monitored. For example, the monitored parameter may comprise a parameter derived from other data, such as being a temperature of a fluid at a location in the flow line derived from a measurement of a temperature at another location in the flow line, such as downstream (or upstream) of the location. The monitored parameter may be of the fluid or of a conduit defining the flow line. The monitored parameter may be continuously monitored. The monitored parameter may be periodically monitored. The monitored parameter may be measured.

The monitored parameter may be remotely monitored. For example, the monitored parameter may comprise a subsea parameter, monitored at surface. The monitored parameter may be directly associated with the accumulation. For example, the monitored parameter may comprise a temperature and/or a pressure of a fluid at a location of a possible or anticipated accumulation in the flow line. The method may comprise using feedback provided by monitoring the parameter to adapt the heating.

The associated parameter may be planned. For example, the associated parameter may comprise an operational parameter, such as a shut-down, maintenance, intervention, production or other status or condition.

In at least some examples, if the parameter lies sufficiently outside a range or domain for the formation of accumulations; and does not indicate or predict that the parameter is likely to enter the domain, then additional heat energy will not be supplied to the flow line. In at least some examples, if the parameter lies within the domain for the formation of accumulations, or there is an indication or prediction that the monitored parameter may enter the domain, then heat energy will be supplied to the flow line. In at least some examples, the heat energy will only decrease or cease once the monitored parameter is sufficiently outside the domain for the formation of accumulations and there is no indication or prediction that the monitored parameter will re-enter the domain.

The parameter may be modelled and/or predicted. The method may comprise predicting a progression of a parameter into a range for accumulation development. The method may comprise adapting the heating according to a predicted parameter value.

The heating may be actively controlled. The heating may be controlled in response to the associated parameter. The heating may be automatically controlled in response to the associated parameter. The heating may be selectively controlled. The method may comprise controlling the heating with a subsea controller. The method may comprise controlling the heating with a controller associated with the another power sink. The heating may be controlled locally, such as by logic embedded in the another power sink (e.g. actuator/battery module), or in a higher level SCADA system. In at least some examples, the method may comprise adaptively or selectively controlling the heating with a user or manual input.

The heating may be adapted according to a plurality of parameters. For example, the heating may be adapted in accordance with a monitored parameter, such as fluid temperature, and an operating condition, such as a shut-down or reduction in production or supply of fluid associated with the flow line.

The heating may be discontinuous. The heating may be temporally discontinuous. The heating may be one or more of: cyclical; periodic; temporary; and intermittent. The heating may be temporally variable. The heating may be temporally variable in response to the monitored parameter. The heating may be adjusted in accordance with the monitored parameter. The heating may be temporary. Alternatively, the heating may be permanent.

The heating may be localised. The heating may be selectively localised. The heating may be locationally discontinuous. For example, the heating may be segregated or arranged in one or more portions of the fluid system, such as of the flow line. The/each portion of the fluid system may comprise a zone, section, length or the like. The method may comprise heating in at least a first portion and in a second portion, the first and second portions being independently heatable. The first and second portions may be discrete. The method may comprise focusing or targeting heating at a particular portion. The method may comprise targeting or focusing heating at the particular portion temporarily. The method may comprise targeting or focusing heating at the particular portion in response to the parameter. The portion/s may comprise a location of a possible or anticipated accumulation in the fluid system. Additionally or alternatively, the portion/s may be discrete from, or distal to, a location of a possible, anticipated or actual accumulation in the fluid system. For example, the portion/s may be upstream of a location of a possible, anticipated or actual accumulation in the fluid system.

The provision of a method comprising such adaptive heating may allow the heating to be reduced, suspended or halted, such as to improve efficiency and/or reduce costs. For example, the method may comprise reducing or suspending heating in one or more portions when the parameter indicates at least a reduced risk or likelihood of accumulation. The method may comprise actively varying heating in line with the associated parameter/s. The method may comprise only activating the heating or only fully activating the heating when and/or where an accumulation risk is identified.

The method may comprise identifying a portion at risk or more at risk of an accumulation. The method may comprise identifying a portion at risk of an accumulation based upon the monitored parameter. Additionally or alternatively, the method may comprise identifying a portion at risk of an accumulation based upon a predetermined parameter, such as with a predictive model or calculation. The method may comprise actively identifying a portion at risk of an accumulation during operation of the flow line. The method may comprise contemporaneously identifying a portion at risk of an accumulation during operation of the flow line.

The method may comprise heating a portion of the fluid system outside a flow line or main flow line. The method may comprise heating a portion of the fluid system less accessible to other heating, such as DEH. The method may comprise heating a portion of the fluid system that is not otherwise heated, such as not otherwise directly heated. The method may comprise heating a portion that is uninsulated or less insulated, such as a discontinuity in an otherwise insulated pipeline. For example, the method may comprise heating a portion or length of flow line not directly or explicitly heated by DEH, such as a portion or length of flowline adjacent and/or upstream or downstream of a DEH portion. The method may comprise providing additional heating, such as in addition to heating of a main flow line (e.g. in addition to DEH heating of a main flow line). The method may comprise heating equipment not forming part of a flow line, such as subsea equipment. The heating system may be for heating in one or more of: a cooler; a compressor; a choke; subsea production and/or processing equipment, such as in-field distribution equipment.

The method may comprise heating a connector. For example, the method may comprise heating a tie-in connector. The connector may be for one or more of: a riser; a flow-line; a tie-back; a jumper; an umbilical; a rigid pipeline; a flexible pipeline; a vertical riser; a horizontal riser. The method may comprise powering the heating for the connector with the power source, such as one or more batteries, the power source drawing power and/or being associated with the another power sink. The another power sink may be directly associated with the connector, such as a powered connector valve. Alternatively, the another power sink may be indirectly associated with the connector, such as where the another power sink is at or on a manifold, Christmas tree or other subsea structure. The another power sink may comprise one or more of: a valve; a pump; an isolation valve; a branch valve; a gas-lift valve; a sensor; a wye; a pig-launcher. The method may comprise electrically connecting the power source with the another power sink.

The method may comprise heating with an electrical element, such as with a heating coil/s.

The method may comprise heating one or more portions of the connector, such as an inboard and/or an outboard portion of the connector. The method may comprise electrically connecting the connector such that the connector can be electrically heated. The method may comprise electrically connecting the connector after the connector has been mechanically connected (e.g. after the connection, such as a tie-in, has been completed or made up). The method may comprise electrically connecting the connector with one or more of: hard-wiring; a flying lead. The method may comprise connecting at least two portions of the connector, such as an inboard portion and an outboard portion.

The method may comprise connecting the connector portions in parallel. In other examples, the method may comprise connecting the connector portions in series. For example, the method may comprise electrically connecting a first connector portion to a second connector portion, such as electrically connecting the first and second connector portions across a mechanical connection part (e.g. join) of the connector.

The method may comprise heating in a branch flow line. The method may comprise heating in or via a loop flow line. For example, the heating may comprise heating in a recirculation flow line. The recirculation flow line may be configured such that at least a portion of the fluid flowing in the fluid system is recirculated back to the fluid system upstream of the recirculation flow line. For example, the recirculation flow line may recirculate a portion of fluid in a production flow line. The recirculation flow line may comprise a downstream inlet and an upstream outlet. The recirculation flow line may be employed to maintain acceptable liquid/gas ratios for normal pump operation. The recirculation flow line may be for capacity regulation.

The recirculation flow line may comprise a pump, such as a motor-driven pump. The recirculation flow line may comprise one or more of: an inlet fluid conditioning unit; a compressor; a cooler; a liquid collection unit; a valve, a choke valve; a gate valve; a branch valve; an expanding branch valve; and a double expanding branch valve. The recirculation flow line may be used to recirculate heavier fluids from the liquid collection unit to an inlet of the pump.

The recirculation flow line may only periodically require heating. For example, the recirculation flow line may generally be operative outside parameters associated with the development of an accumulation, such as due to a supply of (relatively hot) fluid from a well/reservoir and/or heating of the recirculated fluid (e.g. by a recirculation pump). Accordingly, the recirculation may only require heating, or full heating, when operating outside general or normal parameters, such as during closure or reduction of flow to the recirculation flow line (e.g. operation of a choke in the recirculation flow line or a shut-down of the well). Providing an adaptive heating may enable improvement or optimisation of efficiency, such as to reduce power supply and/or cost and/or wear/maintenance associated or otherwise associated with heating (or accumulation remediation). The recirculation flow line may comprise at least one of the plurality of independently heatable sections. The recirculation flow line may comprise at least two independently heatable sections. The recirculation flow line may comprise all of the independently heatable sections. The recirculation flow may be within a pumping system. The recirculation flow may provide an inhibited fluid for further transit in the flow line, such as to surface or a fluid transfer point. For example, the recirculation flow may condition the fluid, such as by heating and/or pressure control and/or phase control (e.g. controlling fluid profile with density, phase or the like), for continued or further flow downstream of the recirculation flow line.

The/each portion of the fluid system and/or the/each heatable section may correspond to a respective one or more of: a flow line; a reservoir; a chamber; a valve; a gate valve; a branch valve; an expanding branch valve; a double expanding branch valve; a pump; a pump bearing; a casing; a cooler; a recirculation line; and a scrubber.

The recirculation flow line may comprise one or more of: a compressor; a subsea cooler. The recirculation flow line may be configured to regulate capacity of the at least one compressor and/or to clean the at least one subsea cooler.

The heating system may comprise a choke. The choke may be configured to control fluid profile (e.g. liquid/gas ratio). The choke may be variable. The choke may be remotely operated. The choke may be remotely operable by an associated actuator.

The choke may be operated remotely using an actuator which is connected to a control system. The actuator may be electrically powered from the power storage unit. The actuator may contain or be associated with one or more of: an electrical power storage means; a charging circuit; a drive motor; a transmission, such as a drive gear; and selective output switches/heating circuits. The operation or activation of the choke (and/or actuator) may be selected from one or more of: infrequently; frequently; irregularly; regularly; intermittently; and periodically. For example, in some uses, the actuator may be required only infrequently at irregular, intermittent intervals; whilst in other uses the actuator may be required frequently at regular intervals. The electrical power storage means may comprise the power storage unit for the heating system.

The method may comprise maintaining the fluid in the recirculation line at temperatures outside the hydrate domain due to hot fluids from the well and additional heat input from the pump during a pump operation. The method may comprise, during a pump operation, maintaining the fluid in the recirculation line at temperatures outside the hydrate domain without requiring heating, or with a reduced or minimal heating. However, during a system shut in, or if the recirculation choke is closed, the temperature in the recirculation line may drop resulting in a combination of pressure and temperature within the hydrate domain. The conditions for hydrate formation may be detected by monitoring of pressure and/or temperature within the recirculation or bypass line. Parameter monitoring, such as Distributed Temperature Sensing (e.g. with optical fibers), may also give greater resolution along the length of the recirculation or bypass line. For example, distributed parameter monitoring along a length may allow a location of the accumulation to be identified and, optionally, the heating to be directed to the area or section most at risk. Accordingly the method may reduce demand on the power storage unit.

The method may comprise coordinating the heating with another inhibition. The another inhibition may comprise one or more of: environmental inhibition; thermodynamic inhibition; and kinetic inhibition. The thermodynamic inhibition may comprise one or more of: heating; chemical injection or dosing; and pressure reduction. The chemical injection may comprise the injection of one or more chemical inhibitors selected from: a solvent; an alcohol; methanol (MeOH); monoethylene glycol (MEG); a salt (e.g. in drilling fluids); a polymer; a chemical that competes with the hydrate structure for water molecules. The method may comprise adapting at least one of the heating and the another inhibition in view of the other of the heating and the another inhibition.

In at least some examples, the heating may enable a delay in initiation or a reduction in the another inhibition, such as a reduced concentration or a reduced flow or injection rate, or even the elimination, of a chemical inhibitor.

The method may comprise heating the fluid in advance or in anticipation of the another inhibition. For example, the heating may be used to bridge a gap or window in fluid properties that may otherwise arise between a shut-down and chemical circulation, or during limited duration shut-downs. The method may comprise only using the heating system temporarily during shut-downs and/or reductions in flow and/or interventions. The method may comprise using the heating system exclusively during shut-downs and/or reductions in flow and/or interventions. The method may comprise reducing a flow rate of a chemical inhibitor in accordance with the heating and/or reducing a number of injection points for chemical injection.

The kinetic inhibition may comprise one or more of: gel injection; polymer and/or salt dosing; low dosage inhibition; and/or anti-agglomerant inhibition.

The environmental inhibition may comprise a conditioning and/or a pre-conditioning of the fluid. For example, the environmental conditioning may comprise a drying of the fluid upstream of the flow line or at an upstream portion of the flow line.

The method may comprise a plurality of inhibitions. The method may comprise a plurality of dissimilar categories of inhibition. For example, the method may comprise thermodynamic and environmental or kinetic inhibitions. The method may comprise a plurality of inhibitions in a similar category. The plurality of similar inhibitions may comprise dissimilar types of inhibition. For example, the method may comprise a plurality of thermodynamic inhibitions, such as heating and chemical injection. The method may comprise coordinating the plurality of inhibitions. The method may comprise coordinating the plurality of inhibitions in a single section, portion or zone of flow line. For example, the method may comprise reducing, or even eliminating, a level or concentration of chemical injection inhibition as enabled by a heating inhibition. The method may comprise adapting the inhibition in view of another inhibition. The method may comprise adapting the another inhibition according to a heating inhibition. Additionally or alternatively, the method may comprise adapting the heating inhibition according to the another inhibition.

The method may comprise powering the heating according to any other aspect, example, claim or embodiment. For example, the method may comprise powering the heating in accordance with any of the features of the first aspect, such as using a power source intended for powering another power sink in addition to the heating system.

According to a further aspect there is provided a subsea heating system for controlling an accumulation in a subsea flow line. The system may comprise a localized heating apparatus. The system may comprise a plurality of heating apparatus. The plurality of heating apparatus may be segregated. The plurality of heating apparatus may be discrete. The plurality of heating apparatus may correspond to a plurality of sections of flow line. The sections may be discrete. The sections may be independently heatable. The plurality of heating apparatus may be independently operable or adjustable. Additionally, or alternatively, the operation of the plurality of heating apparatus may be linked or coordinated. The heating apparatus may comprise a connector, such as a tie-in connector. The connector may be an in-line connector and/or a junction connector, such as tee-piece connector.

According to a further aspect there is provided a heating apparatus, such as for use in the method or heating system of any other aspect. The heating apparatus may comprise a localized heating apparatus configured to heat localized sections of a fluid system. The heating apparatus may be configured for independent activation or operation, such as independent activation for localized heating. The heating apparatus may be configured to be not directly linked or not directly dependent upon another heating apparatus per se.

The invention includes one or more corresponding aspects, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the power source of one aspect may comprise features of any other aspect). Optional features as recited in respect of a method may be additionally applicable to an apparatus; and vice versa. For example, the system of the second aspect may be configured to perform any of the features or steps of the method of the first aspect.

In addition, corresponding means for performing one or more of the discussed functions are also within the present disclosure.

It will be appreciated that one or more embodiments/aspects may be useful in fluid systems, such as subsea flow lines or underwater pipelines from hydrocarbon reservoirs in deep water.

The above summary is intended to be merely exemplary and non-limiting.

BRIEF DESCRIPTION OF THE DRAWINGS

These and other aspects of the present invention will now be described, by way of example only, with reference to the accompanying drawings, in which.

DETAILED DESCRIPTION

Figure 1A:
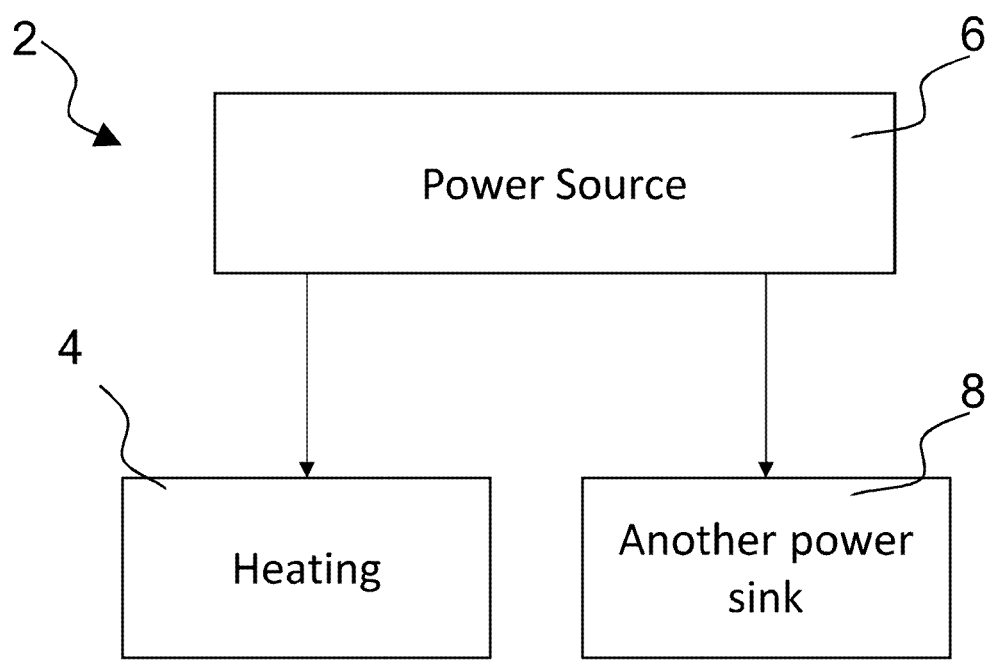
FIG. 1a is a flow chart of a method in accordance with an example of the invention

Referring to FIG. 1a, there is shown a flow chart 2 depicting a method of powering heating 4 for controlling an accumulation in a subsea fluid system, in accordance with an example of the invention. In summary, the method includes a step of powering the heating 4 of a fluid in the fluid system as an additional power sink using a power source 6 intended for powering another power sink 8 in addition to the heating 4. In at least some examples, it will be appreciated that the heating 4 and the another power sink 8 may be powered at least partially simultaneously. In some examples, it will be appreciated that the powering of the heating 4 and the another power sink 8 may be at least partially temporally discrete.

Figure 1B:
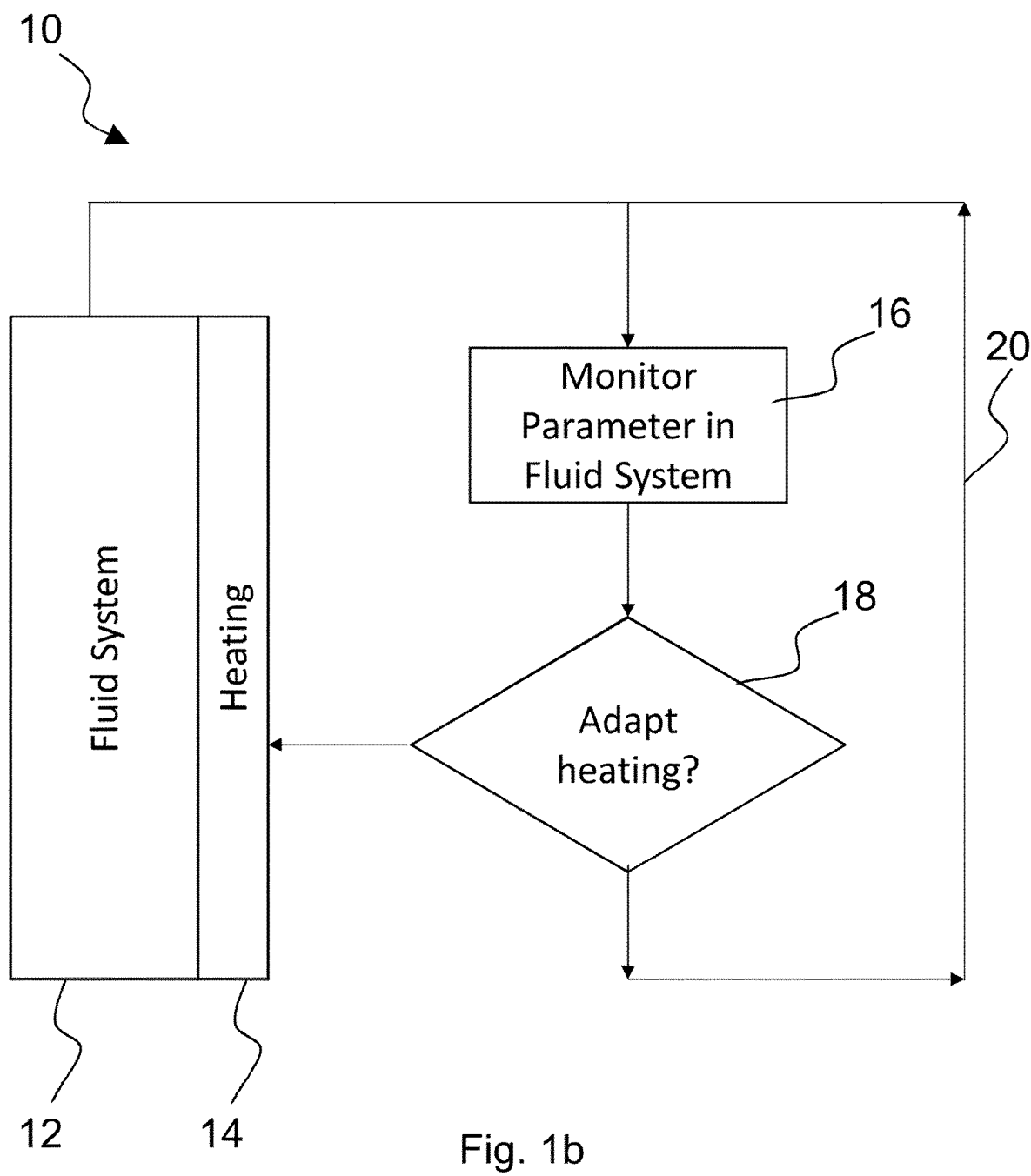
FIG. 1b is a flow chart of a method in accordance with another example of the invention.

Referring to FIG. 1b, there is shown a flow chart 10 depicting a method in accordance with an example of the invention, for controlling an accumulation in a fluid system 12, comprising heating 14. In summary, the steps include monitoring at least one parameter 16 associated with the development of an accumulation in the flow line 12, and adapting the heating 18 of the fluid system 12 based on feedback 20 from the monitored parameter 16.

Here, the fluid system 12 is a pipeline, such as a subsea flow line from a well, through which fluids, such as hydrocarbons, flow in use. The constituents of the fluids can lead to accumulations in use, in the fluid system 12 comprising wax, paraffin or hydrates.

A build-up of wax, paraffin and hydrates in the fluid system 12 is prevented by directly and continuously monitoring 16 the parameter directly associated with such accumulations. Here, the temperature and pressure are closely monitored 16 by temperature and pressure sensors situated at locations of risk of accumulations along a flow line in the fluid system 12.

In use, the feedback 20 provided from monitoring the parameter 16 in the fluid system 12 results in adapting the heating 18, that is varying the heat energy supplied to the fluid system 12 based on the monitored parameter 16. If the monitored parameter 16 lies sufficiently outside the domain for the formation of accumulations, and do not indicate or predict that the monitored parameter is likely to enter the domain, then additional heat energy will not be supplied to the flow line 12. If the monitored parameter 16 lies within the domain for the formation of accumulations, or there is an indication or prediction that the monitored parameter 16 may enter the domain, then heat energy will be supplied to the flow line 12, and the heat energy will only decrease or cease once the monitored parameter 16 again falls sufficiently outside the domain for the formation of accumulations and there is no indication or prediction that the monitored parameter 16 will re-enter the domain.

Therefore, increases and decreases in the heating 14 of the fluid system 12 will occur automatically to accommodate changes in the monitored parameter 16 over time.

Figure 2:
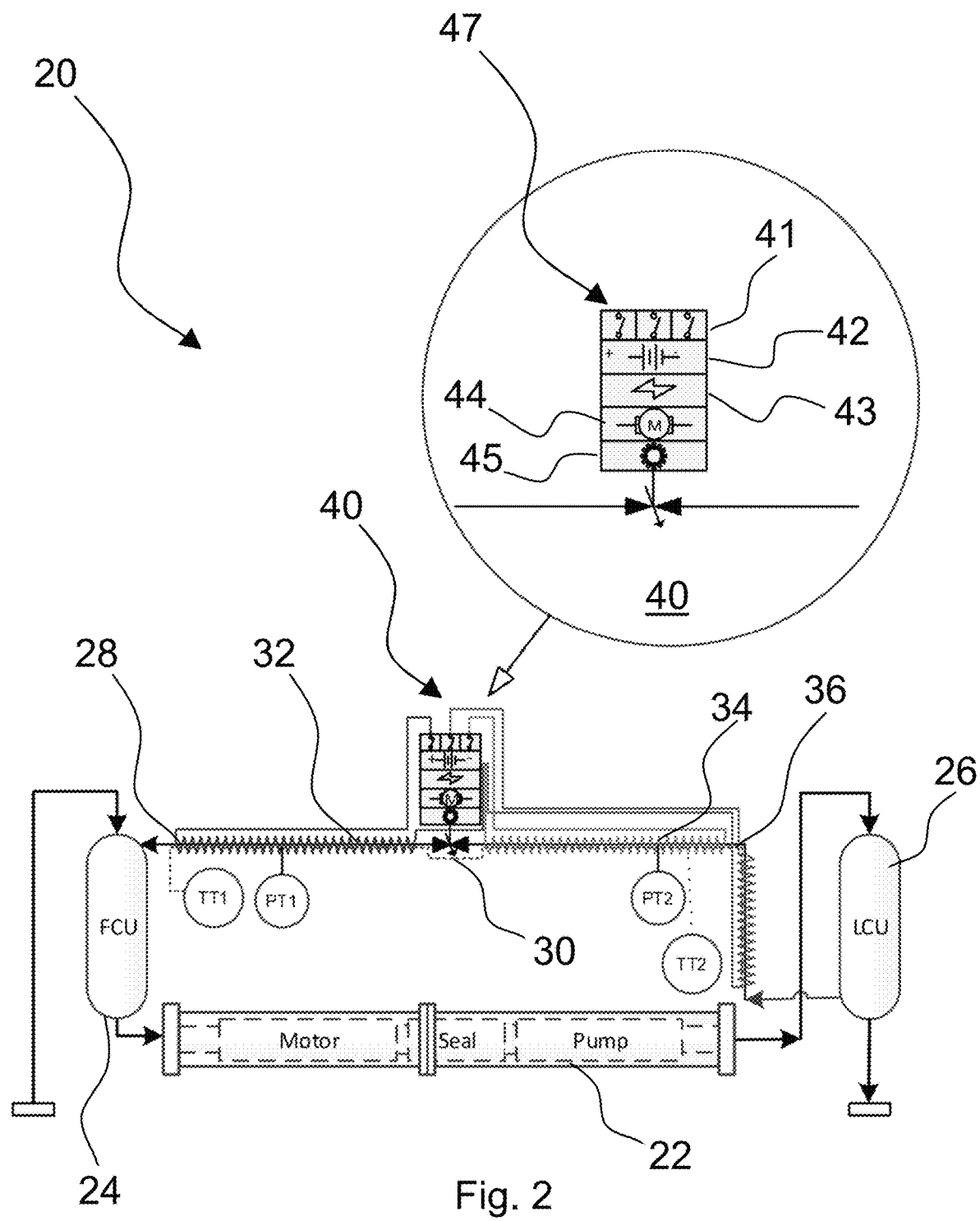
FIG. 2 shows a heating apparatus as used in a further embodiment of the invention.

FIG. 2 shows a pumping system 20 comprising heating elements 32, 34, 36 and a flow line 28 with choke valve 30. The flowline 28 is a fluid recirculation flow line. Heating elements 32, 34, 36 allow three separate heating zones along the flow line 28.

The pumping system 20 also comprises a pump 22, an inlet fluid conditioning unit 24, and a liquid collection unit 26. The pump 22 is a motor-driven pump. In use, the recirculation flow line 28 recirculates heavier fluids from the liquid collection unit 26 to an inlet of the pump 22.

The choke valve 30 is operated remotely using an actuator 40 which is connected to a control system (not shown). The actuator 40 is electrically powered and comprises selective output switches/heating circuits 41, an electrical power storage means 42 such as a battery, a charging circuit 43, a drive motor 44, and a drive gear 45. The choke valve 30 is operated infrequently and the power storage system 42, 43 is charged through a low power delivery system from topside, for example less than 1 kV AC and less than 100 W. It will be appreciated that in some examples, other power delivery systems or charging regimes may be used, such as with more than 100 W, in some examples up to 1000 W, or more than 1000 W in some examples.

The conditions for the build-up of accumulations, such as hydrate formation, are detected by monitoring the pressure using sensors PT1, PT2 and the temperature using sensor TT1 within the recirculation flow line 28. In some operations, the temperature TT1 is measured using Distributed Temperature Sensing with optical fibres (not shown), thus allowing the location of the hydrate to be identified and the heat provided by heating elements 32, 34, 36 to be directed to the zone/s most at risk.

If the choke valve 30 is open during the operation of the pump 22, the fluid in the recirculation flowline 28 is maintained at temperatures outside the hydrate domain due to hot fluids from the well and additional heat from the pump 22. Accordingly, the heating elements 32, 34, 36 are not required and energy can be saved by not unnecessarily activating the heating elements 32, 34, 36. However, if the choke valve 30 is closed, or partially closed, the temperature in the recirculation flowline 28 can drop and a risk of accumulation development may be identified using the PT1, PT2, TT1, TT2 due to a combination of pressures and temperatures falling within the hydrate domain.

The recirculation flow line 28 therefore only requires periodic heating from the heating elements 32, 34, 36. The recirculation flow line 28 is generally operative outside the pressures and temperatures associated with the development of an accumulation due to heating of the recirculated fluid by the pump 22. Therefore the recirculation flow line 28 only requires heating when operating outside normal parameters, such as during reduction of flow to the recirculation flow line 28 due to the closure of the choke valve 30. In some operations, the activation of the heating elements 32, 34, 36 can be linked to the operation of the choke valve 30, such that the heating elements 32, 34, 36 can be selectively activated when the choke valve 30 is closed.

In use, the fluid in the recirculation flow line 28 is generally maintained at temperatures and pressures outside the hydrate domain. The conditions associated with hydrate formation are detected by monitoring the pressure and temperature within the recirculation flow line 28. In the event that pressures and temperatures outside normal parameters are detected by the sensors TT1, PT1, PT2, thus indicating a potential buildup of hydrates, the control electronics within actuator 40 are commanded from the control system to individually switch on the required heating element 32, 34, 36 through switch module 41. In other embodiments, a closed loop arrangement with the sensors and actuator controls the heating. In some examples, switching of the heating is commanded locally, such as by control electronics with a controller 47 within the actuator.

Here, the required heating element 32, 34, 36 remains switched on until pressures and temperatures sufficiently outside the hydrate domain are detected by sensors TT1, PT1, PT2. It will be appreciated that not all of the heating elements 32, 34, 36 may be required simultaneously. For example, the monitored parameters may identify that a pressure and temperature combination has fallen within a hydrate domain in only one of the zones (e.g. the most downstream domain), such that heating from only one of the heating elements 32, 34, 36 is required.

In an example flow line with such a system, a water-filled pipe with a 100 mm inner diameter holding a volume of 7.85 litres per metre can be prevented from developing accumulations. Water has a heat density of 4181 J/kgK so the pipe can be raised 10° C. per metre with (7.851×10° C.×4181 J/kgK)J=328,365 J or (328,365/3600)Wh=91 Wh=0.091 kWh. With a heating efficiency of 90% or greater, a power storage capacity of around 2 kWh provides sufficient energy to raise the temperature of a 20 m long section of pipe by 10° C.; or hold the pipe at a fixed temperature for longer period. Such a system allows additional protection for pipe sections at-risk during extended shut-in times.

Taking a preventative approach has a considerable power saving over remedial. For example, a 1 metre section of pipe containing ice requires an additional 333 kJ/kg latent heat absorption or 0.090 kWh/kg of ice. By monitoring the parameters and heating the fluid before hydrate formation or freezing occurs, less energy is required than would be needed to melt the ice.

In a further embodiment (not shown), an electrically actuated choke positioned on a subsea Christmas tree (XMT) provides power to heating zones along the flow-line between the XMT and a subsea Manifold. Stored power from the XMT choke or other power storage unit subsea on the XMT or Manifold is directed to heating elements on the XMT to Manifold flow-line when hydrate risk is detected.

Figure 3:
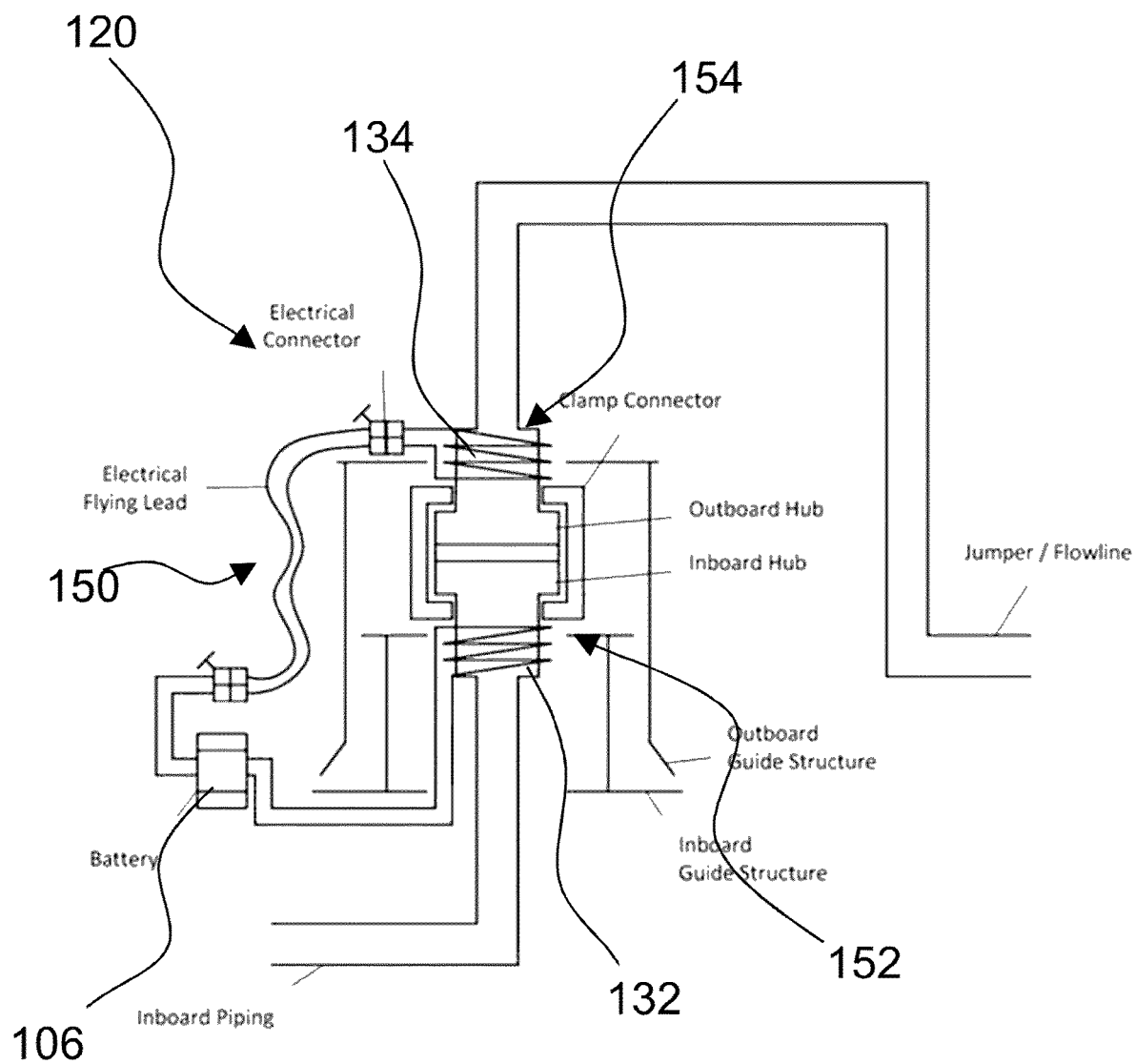
FIG. 3 shows a heating apparatus according to a further example.

FIG. 3 shows a heating system 120, generally similar to that 20 shown in FIG. 2, with similar features denoted by similar references numerals incremented by 100. Accordingly, the heating system 120 of FIG. 3 comprises heating elements 132 and 134. Here the heated portions of the flowline 128 are tie-in connector portions 152, 154 of a connector 150. The heating elements 132, 134 allow heating of inboard and outboard portions 152, 154 of the connector 150 respectively.

Here, the connector 150 is split into two parts 152, 154. The inboard (IB) part 152 contains the IB hub and is located on the host structure. The outboard (OB) part 154 is located on the well jumper or flowline spool, and contains the OB hub and the connection device (clamp or collet connector). It is quite simple to insulate the piping on the structure and the spool/jumper by traditional insulation methods. The connectors are more difficult and will benefit from heating. It will be appreciated that heating coils 132, 134 can be added to the two hubs, such as by retrofitting to existing hubs. As shown here, the heating element 132 for the IB hub can be hard wired to the power source 106. Here, the coil of the heating element 134 on the OB hub is connected with an electrical connector placed on the OB guide structure. After the connector 150 is made up, an ROV can connect the OB heating element 134 to the power source 106 through an electrical flying lead. The flying lead will be connected to the electrical connector on the OB guide structure and a corresponding connector on the host structure.

It will be appreciated that any of the aforementioned devices may have other functions in addition to the mentioned functions, and that these functions may be performed by the same device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present invention may consist of any such individual feature or combination of features. It should be understood that the embodiments described herein are merely exemplary and that various modifications may be made thereto without departing from the scope of the invention. For example, it will be appreciated that although shown here as contiguous and sequential, the heatable sections may comprise other configurations and arrangements, such as non-contiguous and non-sequential (e.g. in separate branch lines or loops; or spaced apart along a single length of flow line). Similarly, although shown here as associated with a choke actuator battery or power supply, the heating may be associated and powered by other means, such as a battery or power supply for other apparatus.

It will also be appreciated that in other embodiments, the valve may be the subject of the heating. For example, the heating system may be for directly heating the valve, noting that in other examples (not shown) the valve may be a gate or other valve, such as a double expanding branch valve.

The invention claimed is:

1. A subsea hydrocarbon system comprising:
   an actuator disposed subsea;
   a battery disposed subsea, and the battery is electrically coupled to the actuator to provide power to the actuator; and
   a heater disposed subsea, and the heater associated with a hydrocarbon flow line, the heater configured to reduce an accumulation in a subsea fluid system of one or more of: hydrate; wax; and paraffin accumulations;
   wherein both the heater and the actuator are connected to the battery, with the heater being directly powered as an additional power sink from the battery, in addition to a primary power sink of the actuator; and
   wherein the heater is configured to heat an apparatus associated with the actuator.

2. The subsea hydrocarbon system of claim 1 wherein the battery powers the heater with spare or surplus power from the battery.

3. The subsea hydrocarbon system of claim 1 wherein the battery continuously powers the heater for a time period and discontinuously powers the primary power sink during the time period.

4. The subsea hydrocarbon system of claim 1 wherein the actuator is a choke actuator disposed subsea.

5. The subsea hydrocarbon system of claim 1:
   wherein the heater comprises a controller for controlling heating in the subsea hydrocarbon system by the heater; the controller configured to adapt the heating in accordance with a monitored parameter associated with the development of accumulation.

6. The subsea hydrocarbon system of claim 5, wherein the heater comprises a plurality of heaters each heater disposed subsea and each heater configured to heat a localized section of the fluid system independently of another subsea heating apparatus.

7. The subsea hydrocarbon system of claim 5, the heater comprises a plurality of heaters, the plurality of heaters being independently adaptable to adapt a level of heating provided by each of the plurality of heaters, and the plurality of heaters are each independently activatable, wherein the plurality of heaters correspond to a plurality of sections of the subsea fluid system, the sections being discrete such that the sections are independently heatable.

8. The subsea hydrocarbon system of claim 1 wherein the battery is charged through a low power delivery system from topside, the low power delivery system being less than 1 kV AC and less than 100 W.

9. The subsea hydrocarbon system of claim 1 wherein the apparatus associated with the actuator is selected from: a flow line; a reservoir; a chamber; a valve; a gate valve; a branch valve; an expanding branch valve; a double expanding branch valve; a pump; a pump bearing; a casing; a cooler; a recirculation line; and a scrubber.

10. The subsea hydrocarbon system of claim 1 wherein the apparatus associated with the actuator is a valve and the actuator is an electric valve actuator, operable to actuate the valve.

11. A subsea hydrocarbon system, comprising: an electric actuator disposed subsea; a battery disposed subsea and electrically coupled to the electric actuator; and a heater configured to prevent an accumulation in a subsea fluid system of one or more of: hydrate; wax; and paraffin accumulations; wherein the heater is connected to a portion of the subsea fluid system outside a main flow line, wherein the portion of the subsea fluid system outside the main flow line is a recirculation line and the heater is configured to heat the portion of the subsea fluid system outside the main flow line.

* * * * *